No. 693,111. Patented Feb. 11, 1902.
M. CONRAD.
LOCKING DEVICE FOR AXLE NUTS.
(Application filed May 11, 1901.)
(No Model.) 2 Sheets—Sheet I.
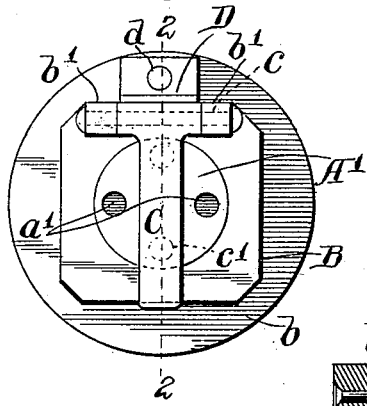
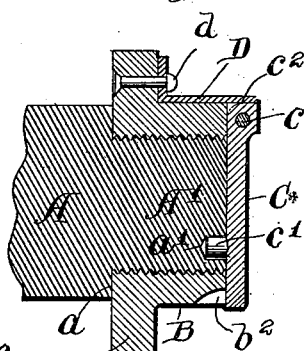
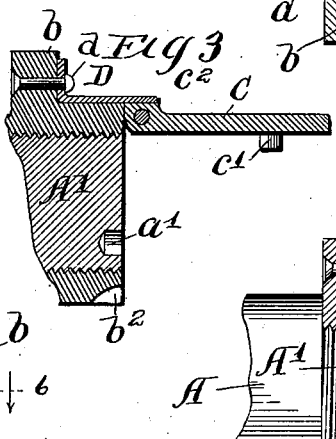
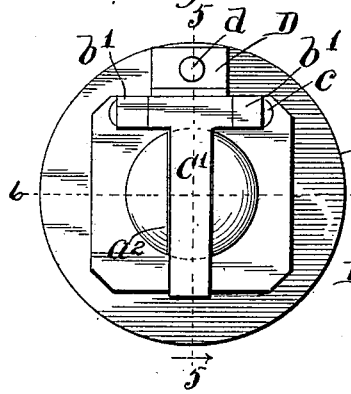
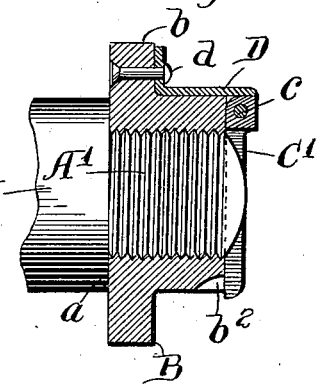
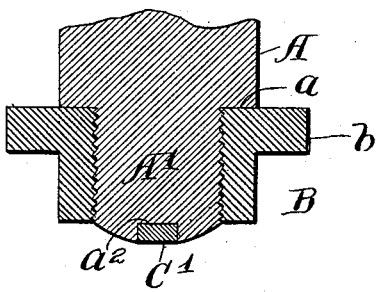
Witnesses:
Carl H. Crawford
W. L. Hall
Inventor:
Martin Conrad
by Poole & Brown
His Attorneys No. 693,111. Patented Feb. 11, 1902.
M. CONRAD.
LOCKING DEVICE FOR AXLE NUTS.
(Application filed May 11, 1901.)

(No Model.) 2 Sheets—Sheet 2.

Witnesses:
Carl H. Crawford
W. L. Hall

Inventor:
Martin Conrad
by Poole & Brown
His Attorneys

THE NORRIS PETERS CO., PHOTO-LITHO., WASHINGTON, D. C.

UNITED STATES PATENT OFFICE.

MARTIN CONRAD, OF CHICAGO, ILLINOIS.

LOCKING DEVICE FOR AXLE-NUTS.

SPECIFICATION forming part of Letters Patent No. 693,111, dated February 11, 1902.

Application filed May 11, 1901. Serial No. 59,716. (No model.)

*To all whom it may concern:*

Be it known that I, MARTIN CONRAD, of Chicago, in the county of Cook and State of Illinois, have invented certain new and useful Improvements in Locking Devices for Axle-Nuts; and I do hereby declare that the following is a full, clear, and exact description thereof, reference being had to the accompanying drawings, and to the letters of reference marked thereon, which form a part of this specification.

This invention relates to improvements in vehicle-axles, and more especially to devices adapted for employment in connection with such axles and the axle-nut by which the wheel is held upon the axle for locking or confining said nut from rotation to prevent the nut from unscrewing or coming off the axle.

A device embodying my invention embraces as its principal feature a hinged leaf or latch pivotally connected with the nut, interlocking parts on the end of the screw-threaded part of the axle and on said hinged leaf or latch adapted to be interlocked when the hinged leaf or latch is folded down against the face of the nut and to be disengaged to permit the turning of the nut when the hinged leaf or latch is swung outwardly away from the outer face of the nut, and a spring applied to the hinged leaf or latch to hold the same in its closed and open position, while permitting it to be readily swung outward and inward or opened and closed.

My invention will be more readily understood by reference to the accompanying drawings, wherein I have shown several different forms of a locking device embodying my invention for securing an axle-nut to an axle.

Figure 7:
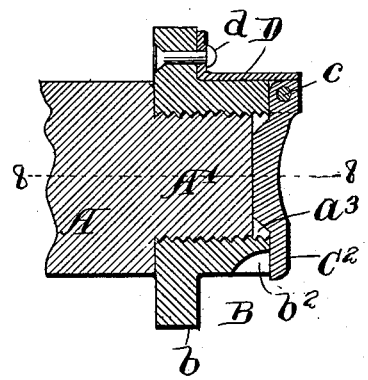
Figure 9:
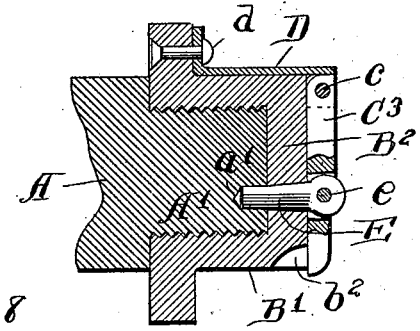
Figure 8:
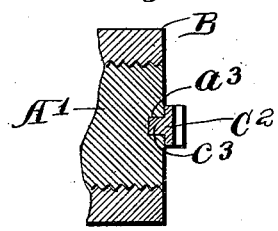
Figure 10:
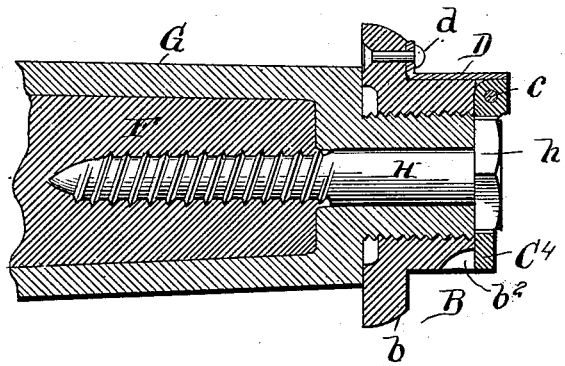
Figure 11:
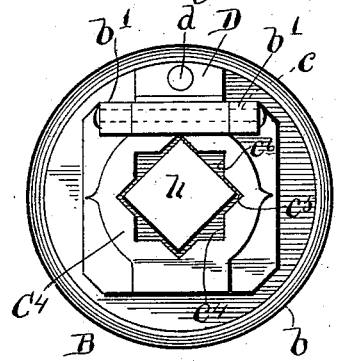
Figure 12:
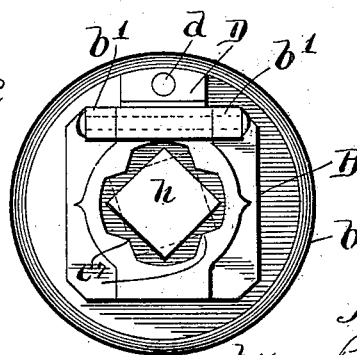

As shown in said drawings, Figure 1 shows in front or end elevation an axle and axle-nut with a nut-locking device embodying my invention applied thereto, showing the latch in its closed position. Fig. 2 is a sectional view taken on line 2 2 of Fig. 1. Fig. 3 is a similar sectional view showing the hinged latch open. Fig. 4 is an end face view of an axle and axle-nut, showing a somewhat different form of locking device. Fig. 5 is a sectional view taken on line 5 5 of Fig. 4. Fig. 6 is a sectional view taken on line 6 6 of Fig. 4. Fig. 7 is a sectional view similar to Fig. 5, showing still another form of locking device embodying my invention. Fig. 8 is a detail section taken on line 8 8 of Fig. 7.
Fig. 9 is a section similar to Fig. 7, illustrating a construction in which the nut is closed at its outer end. Fig. 10 is a view showing in longitudinal section the end of a wooden axle with a thimble-skein applied thereto, illustrating a nut and locking device applied to said nut of the kind especially adapted for employment in cases where a lag-screw is inserted through the end of the skein into the wooden axle. Fig. 11 is an end view of the device shown in Fig. 10. Fig. 12 is a view similar to Fig. 11, showing a slightly-modified form of the device therein illustrated.

As shown in the accompanying drawings, Figs. 1, 2, and 3, A indicates the axle arm or spindle of a solid-metal axle-arm, and B the axle-nut applied thereto, said axle-arm having the usual screw-threaded end A' of smaller diameter than the spindle and forming a shoulder $a$, against which the nut B bears when screwed in place, as is usual in the construction of similar axles. The nut B is provided with flat faces for the application of a wrench and with a circular flange $b$ at its base, which bears against the outer end of the wheel-hub, as is usual in such nuts. C indicates a hinged leaf or latch which is pivotally connected with the nut B at one side of the screw-threaded aperture therein by means of a pivot-pin $c$, which passes through one end of said latch and engages at its ends with lugs $b'$, which project from the outer face of the nut B. The main part of the latch C extends across the opening in the nut, and said latch is provided on its inner surface with an inwardly-projecting stud $c'$, which is adapted to engage a hole $a'$, formed in the end surface of the axle-arm, when the latch is closed against the outer face of the nut. The hole $a'$ in the end of the axle is located eccentrically or at a distance from the center of the axle-arm, so that when the latch is closed against the face of the nut and the pin $c'$ is engaged with the said hole $a'$ the interlocking engagement of the stud on the latch with the end of the axle will lock or hold the nut from turning on the axle. For the purpose of holding the latch C in its closed and open positions said latch is provided with a flat end surface $c^2$ adjacent to the pivot-pin $c$ and with a flat outer surface $c^3$ at right angles to the face $c^2$, and a flat steel spring D is attached to the nut in such manner that its free end will press or bear against the flat faces $c^2$ and $c^3$, the parts being so arranged that when the latch is closed against the outer face of the nut the spring by its pressure on the surface $c^2$ will tend to hold it in its closed position, as shown in Fig. 2. By pulling outwardly on the free end the latch the spring will yield to permit the latch to be swung outwardly and will then by its pressure on the flat face $c^3$, Fig. 3, hold the latch in a position at right angles to the face of the nut. In the construction shown the spring D is attached to the nut by having its inner end bent at right angles to its main part, which latter rests against one of the flat faces of the nut, and said bent inner end is secured by a rivet $d$ to the outer face of the flange $b$. The free extremity of the latch C may project slightly beyond the face of the nut, so that it may be easily grasped to throw it outwardly in releasing it from the axle, or, if desired, the nut may be recessed or undercut, so as to form a recess $b^2$ adjacent to and beneath the end of the latch for the insertion of a finger or a wrench in the act of releasing the latch from the axle.

The end of the axle may be provided with several like holes $a'$, either of which may be engaged by the stud $c'$, according to the position of said stud with respect to the axle when the nut is turned to its place against the shoulder of the axle. The employment of more than one hole is not usually necessary, however, for the reason that the inward movement of the nut on the screw-threaded end of the axle is limited by the contact of the nut with the shoulder $a$, and the stud $c'$ will always come to the same position with relation to the axle when the nut is brought into contact with said shoulder, so that the hole $a'$ may be made by a drill or like tool in the proper position to receive the stud when the parts are first assembled by the manufacturer, and in replacing the nut after removal said nut may always be brought back to its original place and with the hole $a'$ in position to receive the stud $c'$. Moreover, this will be true even after the screw-threads on the axle and nut become somewhat worn, inasmuch as in such cases it is not necessary to turn the nut as far as permitted by the worn screw-threads; but the nut may be turned back to the same position which it originally occupied, with the stud $c'$ opposite the hole $a'$, so that if said hole $a'$ be properly located in the first instance to receive the stud $c'$ when the nut is in proper place on the axle and in contact with the shoulder $a$ said nut may always thereafter be brought to the same position preparatory to the locking thereof to the axle by the latch and its locking-stud.

In the use of a locking device made as above described the latch is thrown outwardly away from the face of the nut when said nut is being removed from or placed on the axle, and said latch is thrown inwardly to engage the stud thereon with the axle when the nut is in place, it being obvious that the latch when in its outward or released position will not interfere with the application to the nut of a wrench or like implement used for turning it. Manifestly the flat faces $c^2$ and $c^3$, in connection with the spring acting against the same, serve to hold the latch securely in its operative position when closed and to hold the latch from movement when open or in its disengaged position, so as to leave the nut free to be turned while a wrench is being applied to the nut for taking off or replacing the same.

Figs. 4, 5, and 6 illustrate a construction more especially intended for use in connection with a solid-metal axle-arm having a convex or rounded end surface adapted to project slightly beyond the outer face of the nut when the nut is in place on the axle. In this instance the rounded end of the axle is provided with a transverse groove $a^2$, (shown more clearly in Fig. 6,) and a latch C' is provided, the main part of which has the form of a straight bar adapted to enter the said groove $a^2$ when the latch is closed against the face of the nut, said groove being so located as to properly receive the latch when the nut is in position in contact with the shoulder $a$ of the axle. When the latch is engaged with the groove $a^2$, the nut will be held from turning on the axle in the same manner as in the use of the form of locking device shown in Figs. 1, 2, and 3.

Figs. 7 and 8 illustrate still another construction, also intended for metal axle-arms. In this construction the parts are made like those described in connection with Figs. 1, 2, and 3, with the exception that in this instance the end of the axle is provided with a transverse groove $a^3$, preferably made narrower than the width of the body of the latch, and a latch $C^2$ is used, which is provided on its inner face with a longitudinal rib $c^3$, which enters and fits within the groove $a^3$ when the latch is closed against the outer face of the nut. The end of the axle in this case is flush or practically flush with the outer end of the nut when the nut is in place on the axle, and the groove $a^3$ is formed within the plane of the outer face of the nut, while the rib $c^3$ projects into the aperture of the nut when engaged with said groove. Manifestly the transverse groove $a^3$, with the rib $c^3$ arranged to interlock therewith, operates to hold the nut from turning on the axle in the same way as does the stud shown in Figs. 1, 2, and 3.

In Fig. 9 is shown a construction adapted for use in connection with a nut which is closed at its outer end. In this instance the nut B' is employed, having an end wall $B^2$, which extends over the aperture of the nut and covers the outer end of the axle. A latch $C^3$ is employed in this instance, which latch is pivotally connected with the nut in the same manner as before described in connection with Figs. 1, 2, and 3. Said latch is provided with a stud E, which passes through the wall $B^2$ of the nut and enters a hole $a'$, formed in the end of the axle in the same way as the similar hole $a'$ shown in Figs. 1, 2, and 3. The stud is in this instance pivotally connected, by means of a pivot-pin $e$, with the latch $C^3$, so that in opening and closing the latch it may adjust itself to position with respect to the hole in the wall $B^2$ of the nut through which it passes. Manifestly the latch and pivoted stud E (shown in Fig. 9) operate to lock the nut from turning on the axle in the same manner as do the corresponding parts shown in Figs. 1, 2, and 3.

In Figs. 10 and 11 I have shown a construction in a locking device adapted more especially for use in connection with that form of axle and axle-arm in which a metal axle-skein is used in connection with a wooden axle. In this instance, F indicates the wooden axle-arm, and G the metal thimble-skein applied to said arm. H indicates a lag-screw, which is inserted through the outer end of the skein G and enters the end of the wooden axle F in the usual manner. In this construction the lag-screw H is provided with the usual square or flat-sided head $h$, which bears against the outer end of the skein, and said flat-sided head $h$ is employed in connection with a socket in the latch to afford the desired interlocking connection of the nut with the axle. In this instance the nut B is like that hereinbefore described, and the latch $C^4$ is connected with the said nut by means of a pivot-pin $c$ passing through lugs $b'\ b'$ on the nut. A spring D is also employed, said spring being attached to the nut in the same manner as that illustrated in said Figs. 1, 2, and 3. The latch $C^4$ has the form of a flat plate, provided with a central socket $c^4$, which is adapted to receive and fit over the head $h$ of the lag-screw, the latch being adapted to rest flat against the outer face of the nut, with the head $h$ of the lag-screw projecting into said socket. The head $h$ of the lag-screw is usually made with four flat sides, and the latch $C^4$ is shown as adapted for use in connection with a head of this shape, said latch being provided in the sides of its socket with two sets of angular notches $c^5\ c^6$, either set of which may be engaged with the four corners of the head $h$. The employment of a plurality of sets of notches provides for varying positions of the head of the lag-screw, it being obvious that the corners of the lag-screw head would be unlikely to come in proper position to enter the socket of the latch if the latter were provided with a square socket. By providing two or more sets of notches in the said socket, however, the lag-screw may be turned slightly either backward or forward after the nut has been placed upon the axle, so as to bring the corners of the lag-screw head accurately in position for engagement with one of the sets of notches in the latch, it being obvious that inasmuch as the lag-screw engages the wooden axle it may be turned in either direction to the slight extent necessary for the purpose without liability of loosening it and without effect so far as the proper performance of its function as a means of holding the thimble-skein on the axle is concerned.

In Fig. 12 is shown a construction of the latch wherein provision is made for proper engagement of the lag-screw head with the socket in the latch without usual necessity for adjusting the lag-screw by turning it in the axle. In this construction the socket in the latch is made of substantially circular form and is provided at intervals around its margin with angular inwardly-extending projections $c^7$, between which are formed notches to receive the corners of the lag-screw head. The said notches in this instance are so large or made so wide circumferentially as to receive corners of the lag-screw head in most positions of the same, so that any turning of the lag-screw to enter said notches will usually be unnecessary. In this construction manifestly the nut will be free to move a short angular distance before the corners of the lag-screw head come into contact with the projections $c^7$, and thereby arrest further rotation of the nut; but such movement in most cases will not be found objectionable, because not sufficient to permit the loosening of the nut to an injurious extent or to an extent which would produce objectionable endwise movement of the wheel upon the axle.

A general advantage gained by the locking device described in all the forms in which it is illustrated is that the same affords a means by which an axle-nut when in its proper place upon the axle can be locked positively from turning or unscrewing through the jarring of the axle or turning of the wheel, while at the same time such device is simple and inexpensive to construct, is adapted to be operated by the hand without the use of any special tool or implement, and permits quick and easy disengagement of the nut from the axle when it is desired to remove the nut and equally quick and easy locking of the nut to the axle when placed upon the latter. As is well understood by those familiar with this art, the screw-threads of an axle and an axle-nut frequently become worn through the lodgment of sand or grit on the screw-threads when the nut is removed and replaced, so that after many removals of the nut the screw-threads become so loose as to no longer hold the nut from turning through frictional engagement of the parts due to a tight fit of the nut on the screw-threaded part of the axle. The locking device described obviously enables the nut to be locked to the axle always in the same position as that in which it was originally placed, notwithstanding such wear of the screw-threads. It will be observed, moreover, that all parts of the locking device described are located at or on the outer face of the nut and at the end surface of the axle to which the nut is applied, so that the application of said locking device to an ordinary vehicle-axle and nut interferes in no way with the projecting annular part or band of the wheel-hub which surrounds the nut and requires no modification or change in said wheel-hub and no change in the axle whatever in cases where a lag-screw is used and the making of a simple slot or hole only in the case of a solid-metal axle. It follows that the locking device herein described may be readily and easily applied to axles already in use and that in the case of an axle provided with a lag-screw a nut having a latch provided with a socket for the lag-screw head may be substituted for the nut previously in use on such axle without any change in the axle whatsoever.

I claim as my invention—

1. The combination with an axle provided with a screw-threaded projection at its end to receive an axle-nut, of an axle-nut having interior screw-threads to engage those on the axle, a latch hinged to the nut at one side thereof and adapted to extend across the outer face of the nut and the end surface of the axle, and interlocking parts on the outer end of the screw-threaded projection on the axle and on said latch located at a distance from the center of the axle and adapted for engagement with each other when the latch is closed against the face of the nut.

2. The combination with an axle provided with a screw-threaded projection at its end adapted to receive an axle-nut, and an axle-nut having interior screw-threads fitting those of the projection of the axle, of a latch hinged to the nut at one side thereof and adapted to extend across the outer face of the nut and the end surface of the projection of the axle, and interlocking parts on the outer end of the axle and on the said latch, said interlocking parts being adapted for engagement with each other in a plurality of angular positions of the nut upon the axle.

3. The combination with an axle provided with a screw-threaded projection to receive an axle-nut and provided with a lag-screw, the head of which projects beyond said screw-threaded projection, and an axle-nut having interior screw-threads adapted to engage those on the projection of the axle, of a latch hinged to the nut at one side thereof and adapted, when closed, to extend over the outer face of the nut and the end of the axle, said latch being provided with a socket adapted to receive the head of the lag-screw, and said socket having a plurality of notches, whereby the head of the lag-screw may be engaged therewith in a plurality of positions of the nut upon the axle.

In testimony that I claim the foregoing as my invention I affix my signature, in presence of two witnesses, this 9th day of May, A. D. 1901.

MARTIN CONRAD.

Witnesses:
BERNARD ABELER,
R. C. WIEDEMAN.